United States Patent [19]

Graham et al.

[11] 3,929,191
[45] Dec. 30, 1975

[54] METHOD FOR TREATING SUBTERRANEAN FORMATIONS

[75] Inventors: John Wayne Graham; Thomas Wayne Muecke; Claude Everett Cooke, Jr., all of Houston, Tex.

[73] Assignee: Exxon Production Research Company, Houston, Tex.

[22] Filed: Sept. 25, 1974

[21] Appl. No.: 509,155

Related U.S. Application Data

[63] Continuation-in-part of Ser. No. 497,797, Aug. 15, 1974, abandoned.

[52] U.S. Cl. ............... 166/276; 166/280; 166/295; 166/308
[51] Int. Cl.² ................... E21B 43/02; E21B 43/26
[58] Field of Search ........... 166/276, 295, 278, 280, 166/308; 175/72

[56] References Cited
UNITED STATES PATENTS

| | | | |
|---|---|---|---|
| 2,846,390 | 8/1958 | Lummus et al. | 166/295 X |
| 2,981,334 | 4/1961 | Powell, Jr. | 166/276 |
| 2,986,538 | 5/1961 | Nesbitt et al. | 166/276 X |
| 3,026,938 | 3/1962 | Huitt et al. | 166/280 |
| 3,150,726 | 9/1964 | Bodine | 166/295 X |
| 3,209,826 | 10/1965 | Young | 166/280 |
| 3,376,930 | 4/1968 | Kiel et al. | 166/280 |
| 3,696,867 | 10/1972 | Waid | 166/276 |
| 3,760,880 | 9/1973 | Dollarhide | 166/276 |
| 3,780,807 | 12/1973 | Graham et al. | 166/280 X |
| 3,857,444 | 12/1974 | Copeland | 166/276 |

*Primary Examiner*—Stephen J. Novosad
*Attorney, Agent, or Firm*—Robert L. Graham

[57] ABSTRACT

Particles coated with a solid, fusible resin are placed in a subterranean formation. At formation conditions, the resin first melts or softens, and then cures to an insoluble, infusible state. This bonds the particles together forming a permeable, self-sustaining structure in or adjacent the formation. One preferred particle for use in the practice of this invention is a glass bead substrate with an outer layer composed of a solid, fusible, thermosetting resin.

36 Claims, 16 Drawing Figures

METHOD FOR TREATING SUBTERRANEAN FORMATIONS

CROSS-REFERENCE TO RELATED APPLICATION

This application is a continuation-in-part of application Ser. No. 497,797 filed Aug. 15, 1974, and entitled "Method for Treating Subterranean Formations," John W. Graham, Thomas W. Muecke, and Claude E. Cooke, Jr, now abandoned.

BACKGROUND OF THE INVENTION

1. Field of the Invention

This invention relates to the treatment of subterranean, hydrocarbon-bearing formations. In one aspect, it relates to an improved well treatment method which employs particulate material. In another aspect, it relates to an improved particulate material for use, inter alia, in hydraulic fracturing and sand consolidation. In another aspect, it relates to an improved particulate material having utility, among others, as a proppant in hydraulic fracturing and as a screening material in gravel packing.

2. Description of the Prior Art

In the completion and operation of oil wells, gas wells, water wells, and similar boreholes, it frequently is desirable to alter the producing characteristics of the formation by treating the well. Many such treatments involve the use of particulate material. For example, in hydraulic fracturing, particles (propping agent) are used to maintain the fracture in a propped condition. Also, in sand control techniques, particulate material is placed in the well to prevent the influx or incursion of formation sand or particles.

Although particulate material is used in the treatment of formations for a variety of reasons, there is one problem common to most such treatments — the problem of particle stability. This problem can best be appreciated when considered in connection with specific well treating techniques.

In hydraulic fracturing, propping agent particles under high closure stress tend to fragment and disintegrate. Silica sand, the most common proppant, is normally not employed at closure stresses above about 5000 psi due to its propensity to disintegrate. The resulting fines from this disintegration migrate and plug interstitial flow passages in the propped interval. Laboratory tests have shown that the plugging effects of these migratory fines drastically reduce the permeability of a propped fracture.

In certain instances, the use of propping agents other than sand has resulted in improved well productivity. Organic materials, such as the shells of walnuts, coconuts, and pecans, have been used with some success as propping agents for "hard rock" formations. These organic materials are deformed rather than crushed when the fracture attempts to close under the overburden load. Another type of propping agent which deforms rather than fails under loading is aluminum and alloys of aluminum. Generally, the fracture flow capacity obtained with aluminum pellets is about one-third higher than obtainable with rounded walnut shells of corresponding particle size. However, the fractures obtained using these deformable proppants is not always satisfactory. Due to the deformation of such particles, the propped fracture width is considerably smaller than the original proppant diameter and the fracture flow capacity is less than would have been obtained had the proppant remained rigid. In addition, as these particles are squeezed flatter and flatter the space between the particles grows smaller further reducing flow capacity. The metallic pellets, in addition to being more expensive, also exhibit limited resistance to acid, brine, and other chemicals used in fracturing treatments.

One relatively new proppant is spherical pellets of high-strength glass. These high-strength glass proppants are vitreous, rigid, and have a high compressive strength which allows them to withstand overburden pressures of moderate magnitude. These glass beads are chemically inert to most fluids used in a fracturing operation, and their uniform sphericity aids in placing the particles and providing maximum flow through the fracture. While these particles appear to have some applicability when employed in monolayers or partial monolayers, they are less satisfactory in multilayer packs. Tests have shown that multilayer packs of such particles in a high temperature, brine environment tend to fail with a large decrease in permeability. ("Conductivity of Fracture Proppants in Multiple Layers," C. E. Cooke, Jr., Journal of Petroleum Technology, Sept. 1973, pages 1101–1107). In brine, at 250°F, the high-strength glass beads have a tendency to disintegrate at stress levels between 5000 and 6000 psi with a resultant permeability which is no better, if not worse, than sand under comparable conditions.

Resin-coated particles have also been used in efforts to improve stability of proppants at high closure stresses. Sand or other substrates have been coated with an infusible resin such as epoxy. Laboratory tests indicate that such composites are superior to sand at intermediate stress levels. However, at high temperature and high stress levels, the resin-coated particles show a decrease in permeability to about the same degree as silica sand.

In gravel pack completions, particularly sized aggregate is placed in the well adjacent to the formation to form a filter bed through which produced fluids must flow. In one type of gravel pack completion, e.g. linerless gravel pack, the aggregate material is injected through the well casing perforations to provide a filter outside the casing for each perforation. This type of completion frequently fails because of the inability of the aggregate to bridge across the perforation, with the result that the aggregate and formation sand enter the wellbore.

Another type of gravel pack completion frequently used for sand control purposes is the liner gravel pack. This type of completion employs a well liner or screen packed in aggregate. Because of settling or migration of the aggregate it is frequently difficult to maintain the gravel in surrounding relation to the liner. Also, failure of the liner caused by corrosion or collapse results in the loss of the filter bed surrounding the liner, at least in the vicinity of liner failure.

It is thus seen that a desirable characteristic of well completions involving the use of particulate material is one of particle stability. Efforts to provide such stability, particularly in gravel pack completions, include the use of organic resins or resinous material.

A gravel pack technique that has been proposed but not widely accepted involves the use of a liquid resin to bond the aggregate together. In this technique, a slurry of the liquid resinous material and aggregate is placed in the well. Upon curing, the resin bonds the aggregate together into a permeable, self-sustaining structure. This technique, however, is quite expensive and therefore is seldom used for long intervals. Moreover, it requires special mixing equipment and placement procedures to guard against premature curing of the resin.

A variation of this technique comprises a two-step operation wherein the aggregate is placed and then the liquid resin is injected into the packed interval. A problem associated with this variation is the inability of the resin to uniformly invade the packed interval and coat all of the aggregate.

SUMMARY OF THE INVENTION

The present invention is an novel well treating method and which employs an improved resin-coated particulate material.

In a preferred embodiment of the invention, a one-step, phenolic resin is used as a coating for particulate material. At normal surface temperatures, the coating is characterized as hard and nontacky such that the particles exhibit little tendency to agglomorate and are free flowing. This characteristic permits the particles to be employed in the treatment of wells using conventional equipment and techniques. The amount of resin may be relatively small, preferably ranging from about 3 to about 8 percent based upon the total weight of the composite material. To improve the bond between the resin and internal particle, it is preferred that a silane coupling agent be used either in the resin or on the internal particle.

A preferred composite particle is a high-strength glass bead substrate with an outer coating which is a solid, fusible, thermosetting resin. For certain applications where extremely high permeabilities are unnecessary or where the stress on the particles is only moderate, commercial grade frac sand may be desirable as a substrate due to its lower cost.

As applied in hydraulic fracturing, the composite particles are placed in the hydraulically generated fracture; at reservoir conditions the resin coating melts and coalesces with the coating of adjacent particles; and, finally, the resin cures to a hard, infusible state. The particles are thus bonded together at the areas of contact forming a relatively stable, permeable structure within the fracture. Examination of samples under a scanning electron microscope indicate that the particles are completely encapsulated by the cured resin and that the pendular bonds between particles are relatively large in cross section. This not only eliminates the high stress concentrations (e.g. at point contacts) but the encapsulating resin tends to prevent the migration of any fines produced by high stress levels.

Laboratory tests have shown that the fusible resin cured in situ in multiple layers provides for unusually high permeability at high stress, high temperature conditions. The reasons for the surprising results are not fully understood but are believed to be due to the elimination of point contacts between adjacent grains and the encapsulation of the particles with resin.

In gravel pack completions, the resin-coated particles may be injected through the casing perforations using a suitable carrier fluid and permitted to cure to an infusible state. The packed interval surrounding the casing provides a relatively strong, permeable, consolidated framework through which produced fluids must flow to enter the wellbore. The composite material may also be used to pack around the exterior of well screens or liners using conventional gravel pack techniques. The in situ curing of the resin provides a strong, permeable, self-sustaining structure surrounding the liner such that if the liner fails the framework will maintain the filter bed intact.

A novel feature of the invention is the controlled polymerization of the resin at the point of particle placement. The partially cured resin coating for the particles is solid and nontacky at surface conditions. However, when placed in the well, the resin first softens and then cures to a hard, infusible state. Polymerization of the resin in place within the well may be triggered by several mechanisms, but temperature controlled polymerization is preferred. By designing the treatment for a particular formation temperature, the resin can be handled and placed while in the solid state then fused and cured in place without the need of a catalyst or curing agent.

Although the well treatment process of the present invention will be described with particular reference to hydraulic fracturing and gravel pack completions, it should be emphasized that the solid, fusible, thermosetting resin can be used in other types of well treatments such as formation plugging, lost circulation control, and the like.

DESCRIPTION OF THE PREFERRED EMBODIMENTS

The preferred material employed in the method of the present invention is a one-step, alkaline-catalyzed, phenolic resin. This type of resin is frequently referred to as a resole type phenolic resin, or an A-stage phenolic resin. The distinguishing characteristic of the one-step resin is that the resin is soluble in certain solvents, fusible and curable by the application of heat alone, and requires no additional catalyst or curing agent.

The one-step phenolic resins are prepared by reacting phenol with aldehydes in the presence of alkaline catalysts such as inorganic hydroxides, quaternary ammonium hydroxide or tertiary amines. In addition to phenol, resorcinol, alkyl substituted phenols such as cresol, and p-tert.-butyl-phenol, p-phenolphenol, and Cardanol may also be used. The aldehyde is normally formaldehyde but acetaldehyde and furfuraldehyde are also used. The one-step phenolic resins may be prepared by reacting phenol and formaldehyde in a mole ratio of between about 1:1 and about 1:1.5 at a pH above about 7. As the materials react, the average molecular weight of the resin increases. By cooling, the rate of reaction may be slowed and stopped to form a solid, partially polymerized resin which is soluble in organic solvents and is fusible. This solid, one-step, thermosetting resin is commercially available in powder form.

For use in well treatments, it is preferred that the fusible resin be applied as a coating to a particulate substrate. The particulate material may be coated by dissolving powdered resin in a suitable solvent, mixing the resulting solution with the particles, and finally evaporating the solvent. The final product is a composite material consisting of a substrate and an encapsulating coating of a solid resin. This particulate material is characterized as free flowing and can be stored for relatively long periods of time at surface temperatures without appreciable agglomeration. A hot coating process may also be used. This technique involves preheating the substrate to several hundred degrees Fahrenheit, slowly adding a fusible resin to the substrate; mixing the substrate and the resin until the resin melts and completely coats the individual particles; and finally cooling the coated particles to return the resin to the solid state. Tests have shown that the resin-coated particles prepared by the solvent process perform better at high stresses than do the particles prepared by the hot coating process. It therefore is preferred that the proppants be prepared by the solvent process.

Regardless of the coating process, it is preferred that the system include an organosilicon compound to improve the bond between the substrate and resin. For phenolic resins, the preferred coupling agent is an organo-functional silane such as aminoalkylsilane. A silane that has given excellent results with phenolic resins is gamma-aminopropyltriethoxysilane. For epoxy resins, suitable coupling agents include epoxyalkylsilane esters such as beta-(3,4-epoxycyclohexyl) ethyltrimethoxysilane. The effect of coupling agents with resins are well known in the art and are described at length in the literature. The most effective coupling agent for a particular system may be selected on the basis of published literature.

For purposes of illustration, the invention will be described in connection with two preferred embodiments — hydraulic fracturing and gravel pack completions.

Hydraulic Fracturing

Propping agents used in hydraulic fracturing normally range in particle size from about 6 to about 100 mesh with the most common range being between 10–40 mesh. Parenthetically, it should be noted at this point that any reference to mesh size herein is to the U.S. Standard Sieve Series. Sand is by far the most common propping agent currently used because of its low cost and great abundance. However, under certain conditions high-strength glass beads of the type previously discussed will be the preferred substrate. As will be discussed in greater detail hereinafter, glass beads coated in accordance with the teaching of this application show superior permeability retention properties in high temperature environments and in operations where relatively large mesh size particles are desired. For example, 8–12 mesh glass beads exhibit better properties than 8–12 mesh sand at high temperature when immersed in brine. Substrate other than sand and glass beads may also be employed in the practice of this invention such as high-strength, fairly uniform spheres of iron, steel, ceramics, and the like.

The so-called high-strength glass beads or pellets are commercially available materials. One type, sold by union Carbide Corporation under the tradename UCAR Props, is a vitreous, rigid, inert, substantially spherical pellet. These pellets are available in a variety of mesh sizes and have a high degree of sphericity — Krumbin roundness of 0.8 or greater. The compressive strength of these pellets is very high — in excess of 100,000 psi. Another type sold by Union Carbide Corporation under the tradename UCAR Pac has similar properties. The compressive strength of the UCAR Pac is lower than that of the UCAR Props, but its compressive strength is still four to six times greater than sand in 8–12 and 12–20 mesh sizes.

The particles, coated with the fusible, thermosetting resin, may be stored and handled using conventional fracturing equipment and techniques. Some precautions, however, should be taken to insure that the storage temperature is maintained at moderate levels.

In carrying out the fracturing method, a fracture is first generated by injecting a viscous fluid into the formation at sufficient rate and pressure to cause the formation to fail in tension. Earth stresses normally are such to result in a vertical fracture. Injection of the fluid is continued until a fracture of the desired geometry is obtained. A carrier fluid, preferably salt water or hydrocarbon liquid (such as diesel oil) having the proppant suspended therein is then pumped into the fracture. It should be noted that the temperature of the carrier fluid during pumping operations will be low so as to prevent premature curing of the resin. The carrier fluid bleeds off into the formation and deposits the propping agent in the fracture. If the concentration of the proppant in the carrier fluid is between about 2 and 10 pounds per gallon, the proppant assumes a multilayer pattern. At concentrations lower than about 1 pound per gallon, propping is by a partial monolayer pattern.

After the proppant is placed, the well is closed in, with the injection pressure being maintained on the formation. As the pressure within the fracture approaches the normal formation pressure, the fracture walls close on the proppant and apply an overburden stress thereto. At the same time, ambient formation temperature heats the resin. Initially, the resin fuses (e.g., softens or melts) and unites at contact areas with the resin coating of contiguous particles or with the formation walls. As the temperature increases, the polymerization reaction proceeds until the resin is cured to an insoluble, infusible, crosslinked state. The pendular regions between adjacent particles bonds the packed particles into a permeable network having considerable compressive strength.

Tests have shown that curing the one-step phenolic resins in either hydrocarbon liquid or salt water can proceed at relatively low temperatures, between about 135°F and 450°F. The polymerization rate may be increased or the temperature at which the resin cures to an infusible state may be lowered by injecting into the propped fracture a low pH liquid such as an aqueous acid solution. In addition, where the formation temperature is low, as it may be in some shallow formations, the resin-coated particles may be injected into the fracture and the resin may be cured by the application of heat from an external source. For example, the particles may be injected into the fracture in the manner previously described. Subsequently, hot oil may be injected into the fracture to supply sufficient heat for the resin to fuse and then cure to an infusible state.

The well should remain closed in for a sufficient time period to permit the resin to cure sufficiently. This will vary considerably but laboratory tests have indicated that from ½ to 5 days should be sufficient for most wells.

If a fusible thermosetting resin other than the one-step phenolic is employed in the invention, the in situ polymerization of the resin may be initiated and promoted by the injection of a suitable catalyst or curing agent and/or the application of heat from an external source.

Gravel Pack Completions

The composite material consisting of substrate and a resin coating may be used in a variety of sand control techniques involving the placement of a filter bed in surrounding relation to or within a wellbore. This contemplates open-hole gravel packs, inside gravel packs, and linerless gravel packs. In each of these completions, aggregate material is placed adjacent the formation and is sized to screen out or cause the formation sand entrained in the fluid to bridge. The particle size of the aggregate is selected in relation to the size of formation particles. The sizing may be by conventional techniques based upon core analysis data. As a general rule, however, the aggregate size will range between about 6 and about 120 mesh.

In carrying out linerless gravel pack completions the particles, suspended in a carrier fluid, are injected into the well and forced through the well casing perforations. Prior to the injection, it may be necessary to wash behind the perforations to provide sufficient cavity for receiving the particles. During particle placement, the carrier fluid bleeds off into the formation and deposits the resin-coated particles in the cavity previously formed. Following placement of the particles, the well is shut-in permitting the temperature to equalize in the well. Increase in temperature in the packed interval softens or melts the resin coating and then cures the resin to an infusible crosslinked state. The permeable network resulting from this treatment provides a self-sustaining, consolidated interval which prevents the aggregate from flowing through the perforations and entering the wellbore.

In either open-hole or inside gravel pack, a liner is lowered into the well on a tubing string and located opposite the formation. The resin-coated particles suspended in a suitable carrier are pumped through the tubing, through a crossover tool provided in the tubing string, and around the outside of the liner. The carrier fluid enters the liner and returns to the surface via the crossover tool and the casing-tubing annulus. The particles screen out on the liner forming a filter bed in the borehole and in surrounding relation to the liner. When the complete interval is packed in this manner, the crossover tool and the tubing are retrieved. As temperature of the packed interval increases, the resin melts, bonds together, and hardens to the infusible, cross-linked state. This produces a permeable, self-sustaining structure surrounding the liner.

The substrate for the composite particles used in these sand control techniques will be sand in most instances since the necessity for a high compressive strength particle will generally be less in sand control than in propping fractures. However, it will be readily apparent to those of ordinary skill in the art that the substrates which are suitable in fracturing, i.e., high-strength glass beads and relatively spherical pellets of iron, steel, ceramic, and the like, will be equally suitable in these sand control techniques. In fact, under certain conditions, substrates other than sand will be preferred. For example, where the sand control particles are to be subjected to high stress, the high-strength glass beads may be preferred to sand.

Laboratory Experiments

Laboratory experiments were conducted to determine (a) conditions necessary to fuse and cure the resin; (b) properties of the cured resin particles; (c) long term effect of fluid flow through the cured resin; and (d) the permeability of the multilayers of the cured resin particles. Understanding the behavior of the resin-coated particles was aided by using a scanning electron microscope.

The particles employed in the experiments were prepared according to the following solvent technique. Silica sand (10–20 mesh) preheated to 125°F was dry mixed with a powdered phenol formaldehyde resin sold by Union Carbide Corporation under the tradename BRPE 4035. A resin solvent was then slowly added to the particles during mixing to insure uniform distribution of the solvent. The solvent also included a silane coupling agent to provide a strong bond between the resin and the sand. The particles were then dried at 70°F for two hours. As the solvent evaporated, the mix became a viscous slurry and finally broke down into discrete, resin-coated particles. Each particle was coated with about 5 weight percent resin. The resin-coated particles were generally spherical in configuration; had a smooth, hard, outer shell; and were non-tacky.

Several batches of the resin-coated particles were prepared by this solvent process. Specific materials, quantities, and conditions used to prepare each batch of the resin-coated particles were as follows:

TABLE 1

| Material | Description | Tradename | Supplier | Quantity |
|---|---|---|---|---|
| Sand | 10–20 mesh silica sand | Frac Sand | Texas Mining Corporation | 454 grams |
| Resin | One—step phenolic | BRPE 4035 | Union Carbide Corporation | 23.9 grams |
| Solvent, alcohol | methyl alcohol | — | Curtin Matheson Scientific, Inc. | 7.5 grams |
| water | tap water | — | | 2.5 grams |
| Coupling agent | aminoalkyl silane | A-1100 | Union Carbide Corporation | 0.4 cc |

Figure 1:
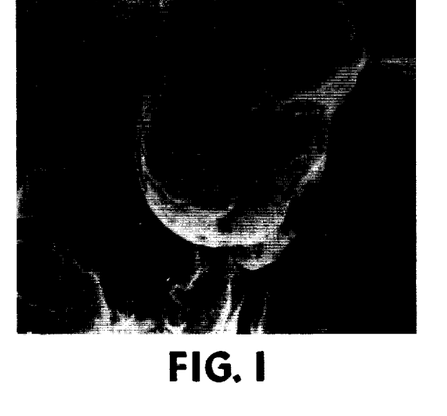
FIG. 1 is a photomicrograph of resin-coated sand particles before the resin has been cured to the infusible state.

FIG. 1 is a photomicrograph (at a magnification of 50 power) of particles coated with the one-step phenolic resin. As can be seen by this photograph, each sand grain is completely encapsulated in a resin coating and the particles are discrete with no evidence of bonding between the particles. It can also be seen that the coating is solid and relatively smooth.

The resin-coated particles were placed in six plastic tubes, one inch in diameter and three inches long. Three of the samples were saturated with a white oil (a product of Exxon Chemical Company sold under the tradename Primol 355) and three samples were saturated with water containing 30,000 ppm of NaCl and 20,000 ppm of KCl. The six samples were placed in an over and cured at 150°F. Following a cure period which varied from 23 to 111 hours, the compressive strength of the samples was measured by removing each cured, consolidated sample from the plastic tube aad placing it between ram type platens. The compressive load was increased in increments until the sample crumbled. The results of the eight samples were as follows:

TABLE II

| Sample | Cure Environment | Cure Time (hours) | Cure Temp (°F) | Compressive Strength (psi) |
|---|---|---|---|---|
| 1 | Oil | 23 | 150 | 341 |
| 2 | Oil | 48 | 150 | 793 |
| 3 | Oil | 111 | 150 | 904 |
| 4 | Salt Water | 23 | 150 | 353 |
| 5 | Salt Water | 48 | 150 | 433 |
| 6 | Salt Water | 111 | 150 | 971 |

In other tests using samples of the resin-coated sand, the resin was cured at higher temperature and under a confining liquid pressure. These data are presented below:

TABLE III

| Sample | Cure Environment | Cure Pressure (psi) | Cure Time (hours) | Cure Temp (°F) | Compressive Strength (psi) |
|---|---|---|---|---|---|
| 7 | Oil | 3000 | 22 | 190 | 1929 |
| 8 | Tap Water | 3000 | 21.5 | 190 | 1949 |

In still other experiments, 80–120 mesh sand (a product sold under the tradename of Clemtex 5) was coated with 5 weight percent of one-step phenolic by the solvent process, cured, and tested for compressive strength. These data are presented below:

TABLE IV

| Sample | Cure Environment | Cure Time (hours) | Cure Temp (°F) | Compressive Strength (psi) |
|---|---|---|---|---|
| 9 | Oil | 64 | 122 | 166 |
| 10 | Oil | 69 | 150 | 414 |
| 11 | Oil | 19.5 | 185 | 1838 |
| 12 | Oil | 44 | 185 | 2190 |

The highest compressive strength tested of 80–120 mesh sand (Clemtex No. 5) coated with 5 percent resin was about 3700 psi. This value was obtained with a 21-hour cure at 250°F in a tightly packed steel cell.

The compressive strength recorded above is adequate for gravel pack completions and in some instances for propping fractures. The compressive strength of the particles can be improved by thorough screening of the sand to ensure that individual grains are coated and not agglomerations of several grains. As reflected by the tests on samples 7 and 8 and as will be developed in more detail below in connection with hydraulic fracturing, the compressive strengths of the resin-coated particles may also be improved by curing the resin under a liquid pressure or a preload compressive force.

Figure 2:
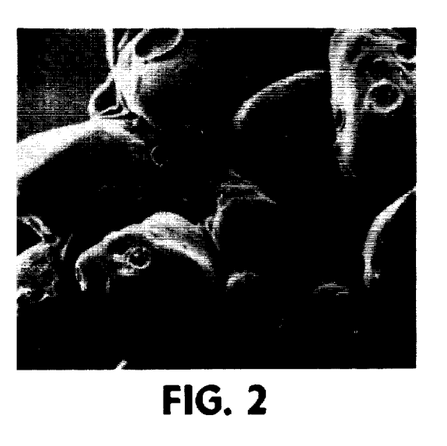
FIGS. 2, 3, 4, 5 and 6 are photomicrographs of the resin-coated sand particles after the resin has been cured to an infusible state under various conditions.
Figure 3:
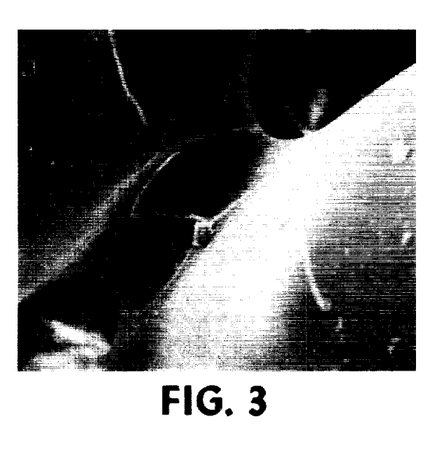

FIG. 2 is a photomicrograph (at magnification power of 20) of one of the samples of Table II which was cured in salt water illustrating the manner in which the individual grains bond together upon cure of the resin. It can be seen from this picture that the bonded particular material forms a permeable, self-sustaining network. The photomicrograph of the same material at magnification power of 200 more clearly illustrates the pendular bond between adjacent particles (see FIG. 3). The pendular bonds between adjacent particles are of considerable areal extent, thus eliminating the point contacts which create high stress points. FIGS. 2 and 3 also illustrate the intergranular porosity and permeability. It should be observed that the coating is relatively smooth and that the flow passages, while tortuous, are smooth and rounded.

Figure 4:
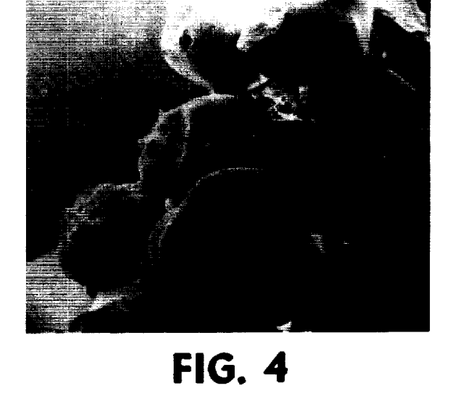
Figure 5:
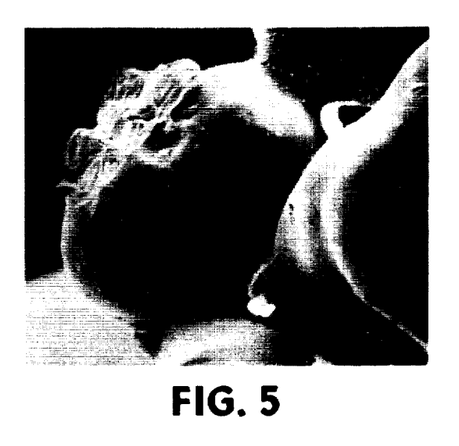
Figure 6:
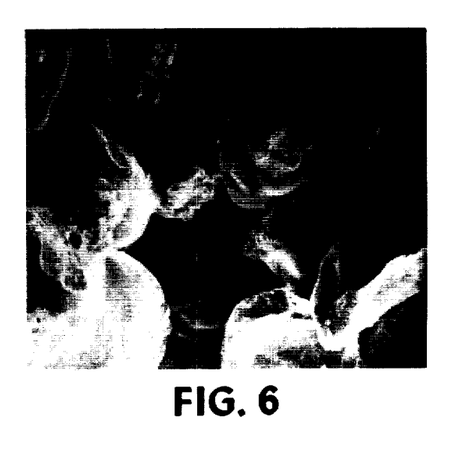

FIGS. 4 and 5 are photomicrographs (at magnification power of 20 and 50, respectively) of another sample following the cure step in oil. The photomicrographs (FIGS. 2–6) show that the melting and uniting of the resin followed by curing to the infusible state produces a coherent, self-sustaining, highly permeable structure. Significantly, the process may be carried out in a brine or hydrocarbon environment.

Additional tests were conducted to determine the long-term effect of fluid through resin-coated sand cured in place. Steel cells, one inch in diameter and six inches long, were packed with 80–120 mesh sand coated with 5 weight percent of the one-stage phenolic resin. Each cell contained 113.7 grams of the coated sand. The cells were then placed in an oven maintained at 230°F for 120 hours. Following cure, water at 160°F was continuously flowed through each cell at a rate of about 0.25 gallons per minute. None of the consolidated samples failed during the first 100 days of testing.

Figure 7:
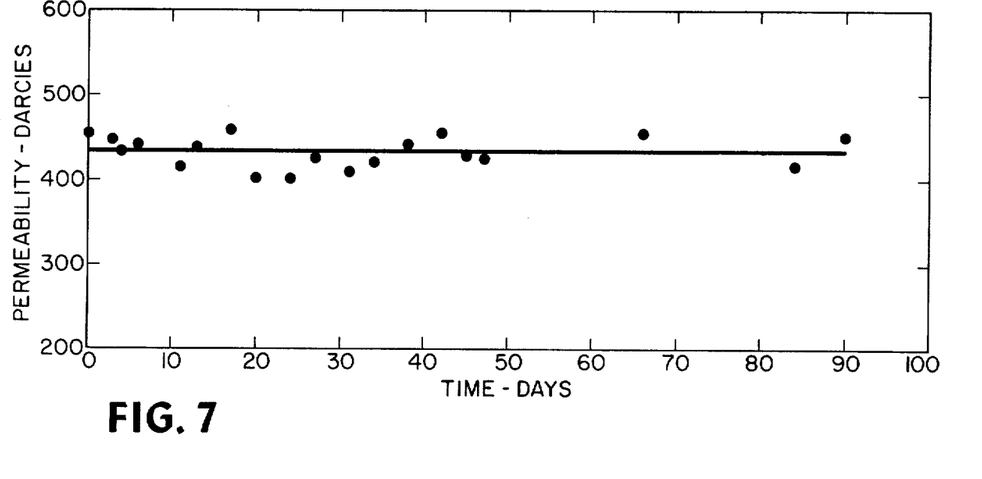
FIG. 7 is a plot of permeability versus time for resin-coated sand particles under applied stress, high temperature, and in a brine environment.

The ability of the samples to resist crushing for long periods of time is equal to if not more important than the ability of the samples to retain permeability. A sample of 10–20 mesh sand was coated with 3 weight percent resin using the previously described solvent technique. The resin-resin-coated sample was cured in place under applied stress and the permeability of the sample to brine was measured in the manner decribed in the article by C. E. Cooke, Jr., supra. During the permeability test the sample was subjected to an applied stress of 5000 psi and a temperature of 200°F for a period of 90 days. Throughout this period, the permeability of the sample to brine remained substantially constant — approximately 430 darcies as shown in FIG. 7.

The above tests demonstrate that the particulate material coated with a fusible, thermosetting resin and cured in place provides adequate strength and particle stability for gravel pack completions. For evaluating the particles as proppants, however, the test, in order to be reliable, requires measuring proppant permeability under simulated reservoir conditions. The test procedure for evaluating the resin-coated particles usable in the present invention included the following steps;

a. Samples of silica sand were coated with the one-step phenolic resin by the solvent process described above.

b. Samples of the resin-coated sand were placed in a pressure cell which included two opposed platens for applying a controlled compressive load. The samples were saturated with brine. An initial stress was applied and the temperature was maintained at about 200°F for about 16 hours to cure the resin.

c. Brine was then flowed through the packed cell and the permeability determined at various stress levels.

The permeability versus stress procedure for evaluating proppants is described at length in a paper by C. E. Cooke, Jr., supra.

The materials, material description, test conditions and test results are presented below.

The photomicrograph (FIG. 6) clearly shows that the sand particles were completely encapsulated by the resin coating and that the bonds between adjacent sand grains provided relatively large stress-bearing areas. It is significant to note from FIG. 6 that there is little evidence of sand fragmentation and that the multilayer consolidated structure has substantial permeability.

Figure 9:
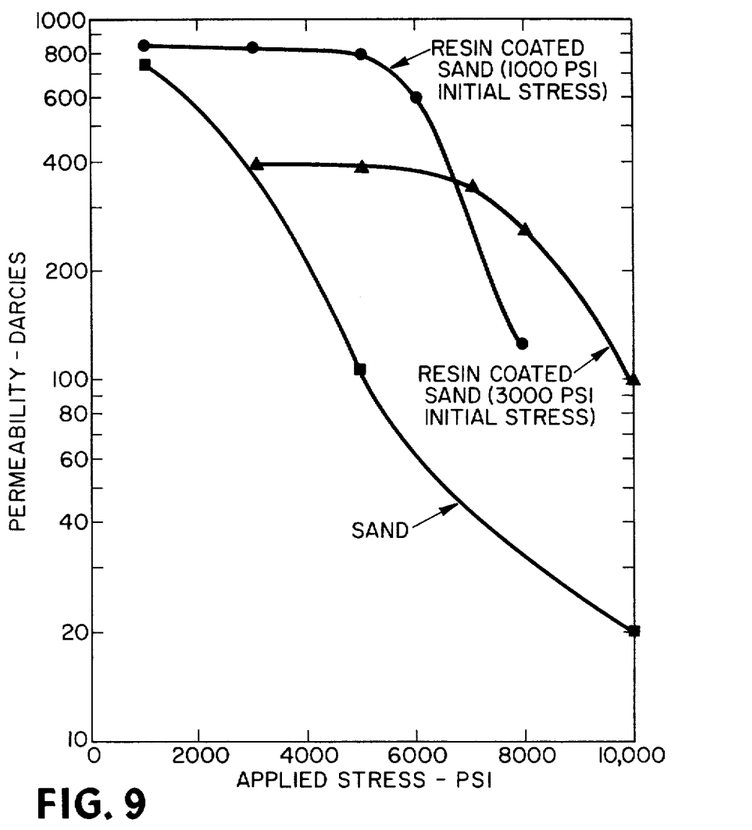
FIG. 9 is a plot of permeability versus closure stress for resin-coated sand particles showing the effect of initial closure stress on permeability.

From the plot of FIG. 9, it can be seen that the initial stress on the uncured resin affects the permeability of the resin. For example, at 3000 psi the uncured resin has an initial permeability close to that of sand. However, as the resin cures to the infusible state with time and temperature, increase in applied stress does not reduce the permeability of the resultant structure as much as in other proppants tested. This is significant because stress levels in the propped fracture normally are higher at high pressure drawdowns, particularly in the immediate vicinity of the wellbore.

For purposes of comparison, the plot of FIG. 9 also includes permeability versus stress data on 10–20 mesh sand (frac sand). Although a minimum amount of pre-stress on the proppants during cure is desirable, high stress loads should be avoided during initial cure of the resin. This may be achieved by a gradual release of injection pressure or by the continued injection of a fluid into the fracture following proppant placement.

Figure 10:
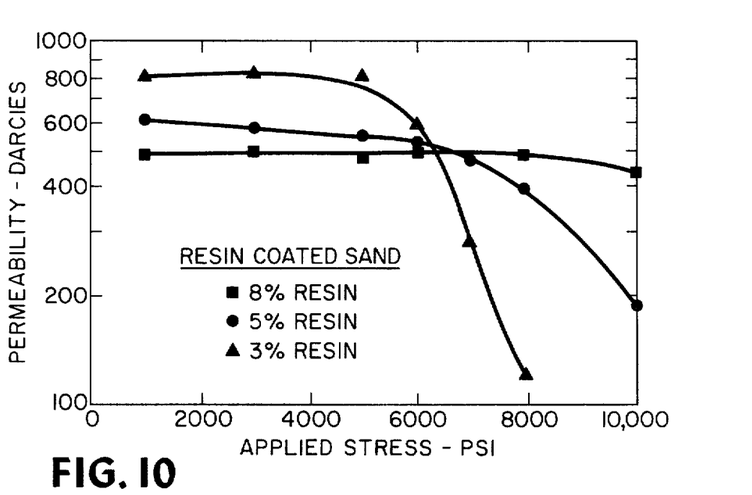
FIG. 10 is a plot of permeability versus closure stress for particles coated with various amounts of resin.

FIG. 10 illustrates the effect of coating thickness on permeability of the packed interval. These tests were performed on 10–20 mesh sand coated with 3, 5, or 8

TABLE V

| Sample | Sand Size (mesh) | Coating Resin | % | Type Cure | Test Temp (°F) | Applied Compression (psi) | Permeability (darcies) |
|---|---|---|---|---|---|---|---|
| 1 | 20–40 | No Coating | — | — | 200 | 3,000 | 180 |
|   |   |   |   |   |   | 6,000 | 60 |
|   |   |   |   |   |   | 8,000 | 27 |
|   |   |   |   |   |   | 10,000 | 15 |
| 2 | 20–40 | One-step Phenolic | 5 | Pre-Cured |   | 3,000 | 150 |
|   |   |   |   |   |   | 5,000 | 41 |
|   |   |   |   |   |   | 8,000 | 10 |
| 3 | 20–40 | One-step Phenolic | 5 | In Place | 200 | 3,000 | 130 |
|   |   |   |   |   |   | 5,000 | 135 |
|   |   |   |   |   |   | 8,000 | 125 |
|   |   |   |   |   |   | 10,000 | 120 |
|   |   |   |   |   | 250 | 10,000 | 80 |
|   |   |   |   |   | 300 | 10,000 | 58 |
| 4 | 10–20 | One-step Phenolic | 3 | In Place | 200 | 1,000 | 820 |
|   |   |   |   |   |   | 3,000 | 810 |
|   |   |   |   |   |   | 5,000 | 800 |
|   |   |   |   |   |   | 6,000 | 600 |
|   |   |   |   |   |   | 8,000 | 120 |
| 5 | 10–20 | One-step Phenolic | 3 | In Place | 200 | 3,000 | 390 |
|   |   |   |   |   |   | 5,000 | 380 |
|   |   |   |   |   |   | 7,000 | 340 |
|   |   |   |   |   |   | 8,000 | 260 |
|   |   |   |   |   |   | 10,000 | 100 |

Figure 8:
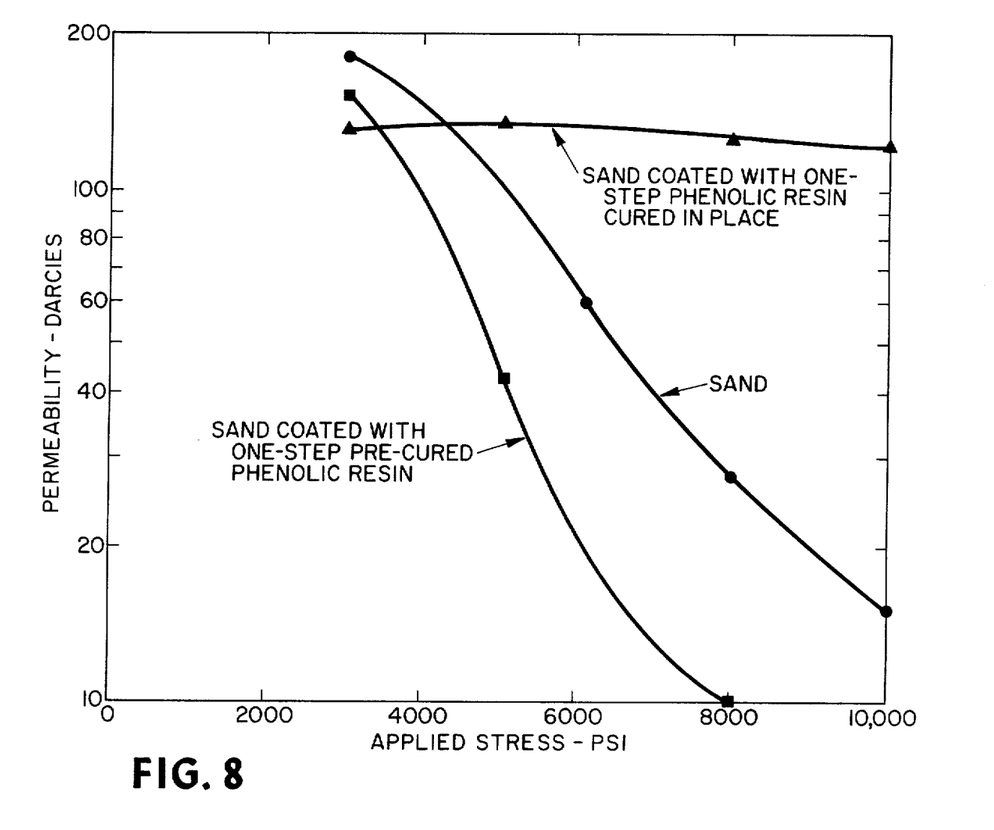
FIG. 8 is a plot of permeability versus closure stress for several particles.

Data obtained during the tests are graphically presented in FIGS. 8 and 9. FIG. 8 is a plot comparing the performance of the sand coated with a one-step resin with other proppants. As can be seen, the particles with resin which was cured to the infusible state in place performed much better than the silica sand, or pre-cured phenolic coated sand. The precured phenolic was cured to the infusible state prior to placing the particles in the test cell. The precured phenolic coating was incapable of melting and bonding with coatings of adjacent particles.

Following the permeability measurements, a sample which had been stressed to 8000 psi was removed from the pressure cell and photographed under the scanning electron microscope at a magnification power of 20.

percent of one-step phenolic resin and cured in place in a brine environment. The plots clearly show that all samples retained substantially more permeability than 10–20 mesh sand at high stress levels. Resin coatings of 3 weight percent or higher are preferred, particularly for deep, high stress applications.

In lieu of one-step phenolics, the invention may employ other fusible and thermosetting resins such as two-step phenolic resins or epoxy resins. For example, an epoxy resin including a latent, modified polyamide hardener may be used to coat the sand particles. At surface conditions, the particles may be stored for relatively long periods of time; however, at reservoir conditions, the polymerization reaction is accelerated causing the particles to become bonded together.

The cure step in situ may be controlled by the addition, via carrier fluids, of curing agents, retarding agents, accelerators, or catalysts. Also thermal techniques such as application of heat may be used to control in situ reactions. However, regardless of specific techniques employed, the resins utilized in accordance with the present invention are placed in the well in the substantially solid state and then fused and cured in place.

Figure 11:
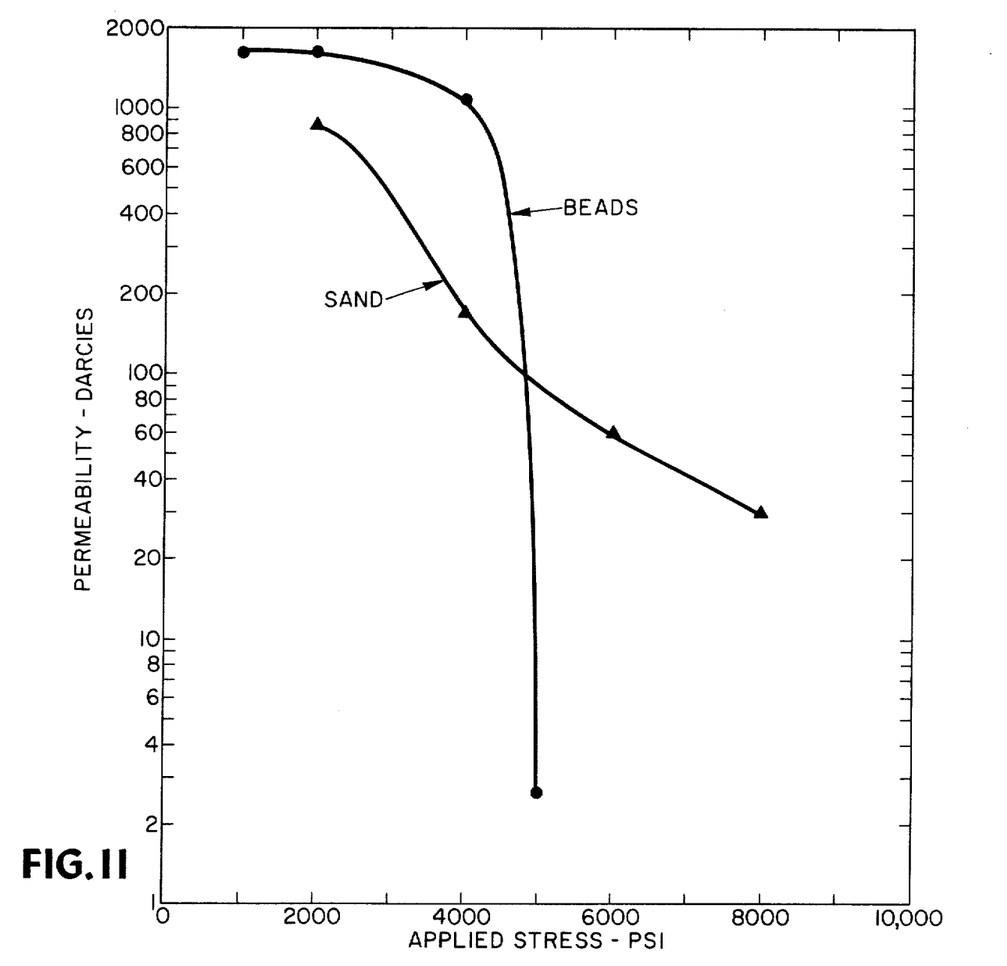
FIG. 11 is a plot of permeability versus closure stress for several particles.

As has been previously discussed, high-strength glass beads are the preferred substrate where the particles are subjected to high stresses. This is somewhat surprising when it is realized that uncoated sand is superior to glass beads at high stress. FIG. 11 shows the stress-permeability relationship of 8–12 mesh frac sand and 8–12 mesh glass beads. As can be seen from this figure, the permeability of the sand is greater than that of the beads at stresses above 5000 psi. Both measurements were made at 250°F and in a brine environment. The permeability of the high-strength beads at 5000 psi is less than three darcies; the sand at 6000 psi still has a permeability of approximately sixty darcies. Even at 8000 psi, the permeability of the sand is still on the order of thirty darcies.

Figure 12:
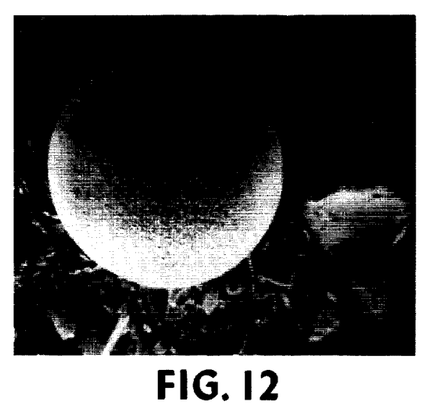
FIG. 12 is a photomicrograph of uncoated high-strength glass beads which have been subjected to high stress.

The reason for the extreme reduction in the permeability of the high-strength glass beads at higher stress levels is probably due to production of extremely fine particles when the individual beads begin to fragment. FIG. 12 is a photomicrograph at 20 power magnification of a sample of 8–12 UCAR Props which have been subjected to very high stress levels. These samples were placed in a two-inch diameter steel cell at room temperature in a dry environment. A stress of 10,000 psi was applied to the samples. When the samples were removed from the cell, it was found that 44 weight percent had been crushed to extremely small fragments with 56 percent of the beads retaining their integrity. FIG. 12 shows the condition of the samples after removal from the cell; in the center is one of the particles which retained its integrity. The background shows the fines which resulted from the particles which disintegrated. These fines would, of course, have the tendency to migrate and plug flow channels in a pack of these high strength glass beads.

Figure 13:
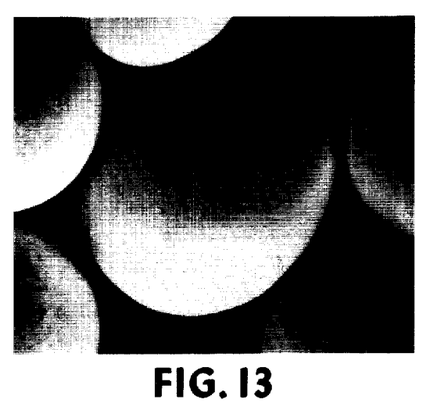
FIG. 13 is a photomicrograph of high-strength glass beads prior to being coated with resin.

To illustrate the superior benefits of the glass beads as substrate under certain conditions, samples of the high-strength glass beads were coated with the fusible resin, cured in situ, and the permeability of the cured, fused, resin-coated beads was determined in a high stress, high temperature brine environment. The solvent technique previously described was used to coat 8–12 mesh UCAR Props. FIG. 13 is a photomicrograph at 20 power magnification of these pellets prior to coating.

Figure 14:
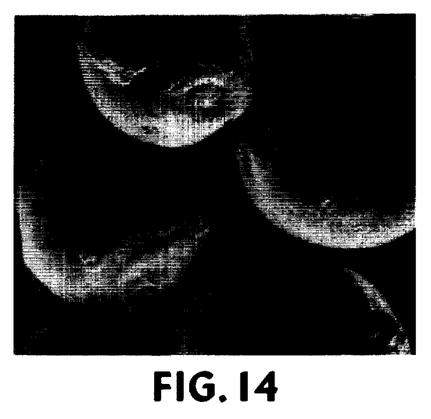
FIG. 14 is a photomicrograph of resin-coated high-strength glass beads before the resin has been cured to the infusible state.

In the coating process, the beads were dry mixed with a powdered phenol formaldehyde resin (BRPE 4035) and a resin solvent was added to the mixture along with a silane coupling agent. The slurry was then dried to evaporate the solvent leaving a residual coating of about 5 weight percent resin on the beads. The resin coating was a hard, outer shell which was nontacky and solid. FIG. 14 is a photomicrograph at 20 power magnification showing the condition of the beads following this solvent coating technique. Although the coating is relatively rough, the coated beads are more nearly spherical than the resin-coated sand. Compare FIG. 14 to FIG. 1.

Following the initial coating, the beads were placed in a cell and cured in brine for approximately 16 hours at 250°F with an applied stress of 2000 pounds per square inch. The permeability-stress relationships of these resin-coated beads which had been cured in situ were determined in a manner previously described. Stress was applied to the sample in increasing increments beginning at 2000 pounds per square inch and increasing to 10,000 pounds per square inch at 250°F in a brine environment. Subsequent to the permeability-stress measurements, the sample was removed from the cell and inspected.

Figure 15:
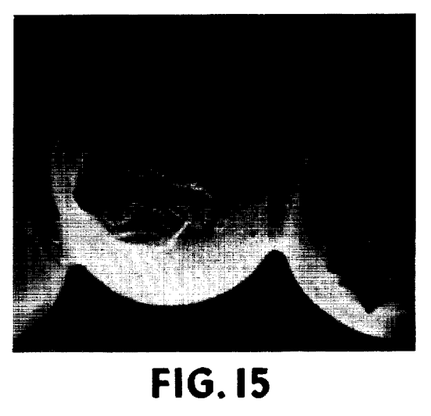
FIG. 15 is a photomicrograph of the resin-coated glass beads after the resin has been cured in place.

FIG. 15 shows the condition of the sample when removed from the cell. As can be noted from FIG. 15, the resin upon curing formed pendular regions of contact between adjacent beads and the resin apparently coated the entire surface of the beads. It will be noted from inspection of FIG. 15 that the upper surfaces of the beads which were in contact with the platen of the permeability pressure cell had formed a substantially flat surface which helped distribute the stress applied to the sample. It will also be noted that a portion of the resin coating at the point of contact with the platen appears to have been removed, and the surface of the high-strength glass bead appears to have been exposed. However, it is believed that this portion of the resin coating probably adhered to the platen and peeled off the bead when the platen was removed from the sample. Also there appear to be stress cracks in the resin coating at the pendular bridge between particles. These stress cracks may have occured when the platen was removed from the top of the sample. The important thing to be noted from FIG. 15, however, is the uniform interstices between the coated particles. These highly uniform flow channels quite naturally give rise to high permeability within the pack.

Figure 16:
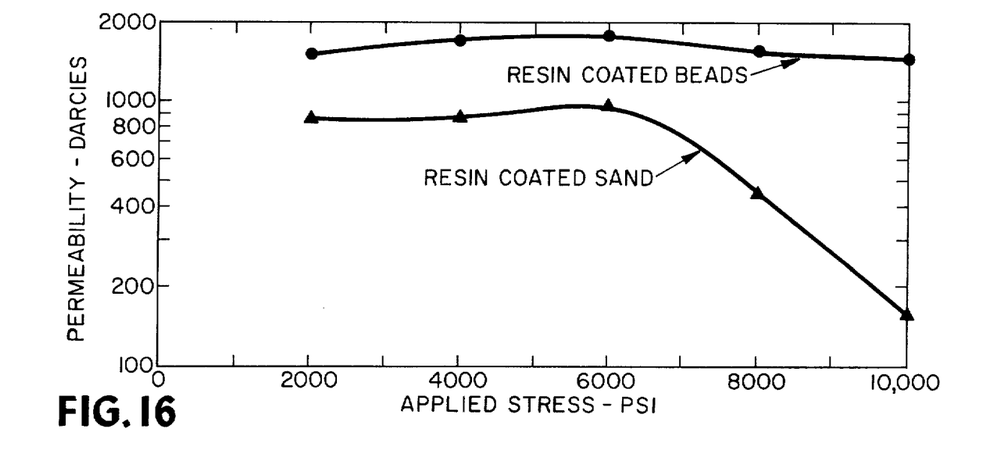
FIG. 16 is a plot of permeability versus applied stress for various resin-coated particles.

The high permeability of the in situ cured, resin-coated glass beads is best illustrated by FIG. 16. As can be seen by inspection of this plot of permeability versus applied stress, the resin-coated beads retained an extremely high permeability throughout the applied stress range from 2000 psi to 10,000 psi at a temperature of 250°F in brine. For comparative purposes, the stress-permeability relationship of resin-coated 8–12 mesh sand cured in situ is also shown on this figure. It will be noted that at stresses below 6000 psi the sand retained its initial permeability; at higher stresses the permeability declined. The 8–12 mesh sand permeability-stress measurements were made under the same conditions as those applied to the glass beads, i.e., 250°F and in a brine environment. It should be noted that at 10,000 psi the in situ cured, resin-coated beads had a permeability which was approximately ten times greater than the resin-coated sand.

The principle of the invention and the best mode in which it is contemplated to apply the principle have been described. It is to be understood that the foregoing is illustrative only and that other means and techniques can be employed without departing from the true scope of the invention defined in the following claims.

We claim:

1. A method of treating a subterranean formation which comprises placing in or adjacent said formation particulate material coated with a fusible, one-step, resole-type phenolic resin and thereafter causing said resin to fuse and cure to an infusible state to thereby bond the particulate material together.

2. A method as defined in claim 1 wherein the resin-coated particulate material is prepared by dissolving the resole type-resin in a solvent therefor, admixing the resultant solution with particulate material, and thereafter evaporating the solvent to form a hard shell resin-coated particulate material.

3. A method as defined in claim 2 wherein the resin is an alkaline-catalyzed phenol formaldehyde.

4. A method as defined in claim 2 wherein the resin is fusible at the normal temperature of said formation.

5. A method as defined in claim 2 wherein the resin is cured in a liquid hydrocarbon environment.

6. A method as defined in claim 2 wherein the resin is cured in a salt water environment.

7. A method as defined in claim 2 wherein the resin coating constitutes not less than 3 weight percent nor more than 8 weight percent of each particle.

8. A method as defined in claim 2 wherein the resin-coated particles further include an organo silicon coupling agent.

9. A method as defined in claim 1 wherein the resin coating constitutes not more than 8 weight percent of each particle.

10. A method as defined in claim 1 wherein the resin is cured with the particulate material under compression.

11. A method as defined in claim 1 wherein the particulate material is silica sand having a mesh size between about 6 and about 100 based on the U.S. Standard Sieve Series.

12. A method as defined in claim 1 wherein the particulate material is glass beads having a mesh size between about 6 and about 100 based on the U.S. Standard Sieve Series.

13. A method as defined in claim 1 wherein the resin-coated particles are prepared by reacting phenol and formaldehyde in the presence of a base catalyst to form a hard resin, dissolving the resin in a solvent which includes an organofunctional silane coupling agent, admixing the solution with particulate matter, and thereafter evaporating the solvent.

14. In a method of propping a fracture in subterranean formations, the improvement which comprises placing in said fracture particles coated with a solid thermosetting resin fusible at formation temperature, and thereafter causing said resin to fuse and cure to an infusible state to bond the particles in said fracture together.

15. A method as defined in claim 14 wherein said resin is a one-step kesole-type phenolic resin.

16. A method as defined in claim 15 wherein the resin coating constitutes from about 3 to about 8 weight percent of the resin-coated particles.

17. A method as defined in claim 15 wherein the resin-coated particles are prepared by dissolving a solid one-step resole-type phenolic resin in a solvent therefor, admixing the resulting solution with particulate material, and thereafter evaporating the solvent.

18. A method as defined in claim 15 wherein the resin is the reaction product of phenol with formaldehyde in the presence of an alkaline catalyst.

19. A method as defined in claim 15 wherein the cure is effected solely by formation heat.

20. A method as defined in claim 15 wherein the particles are silica sand having a mesh size between about 6 and 100 based on the U.S. Standard Sieve Series.

21. A method as defined in claim 15 wherein the resin is cured at formation temperature with the particles under compression.

22. A method as defined in claim 15 wherein the particles are placed in the fracture in an aqueous carrier fluid having a salt content of at least 10,000 ppm.

23. A method as defined in claim 15 wherein the particles are placed in the formation in a liquid hydrocarbon carrier fluid.

24. A method as defined in claim 14 wherein the particles have a glass bead substrate having a mesh size between about 6 and 100 based on the U.S. Standard Sieve Series.

25. A method as defined in claim 24 wherein said glass bead is substantially spherical with a minimum Krumbin roundness of 0.8.

26. A method as defined in claim 24 wherein said glass bead has a compressive strength of at least 100,000 psi.

27. A method as defined in claim 26 wherein said substrate has a specific gravity of approximately 2.6.

28. A method as defined in claim 24 wherein said resin is a one-step, resole-type phenolic resin.

29. A method as defined in claim 29 wherein said resin is an alkaline-catalyzed, phenol formaldehyde.

30. A method as defined in claim 29 wherein the resin coating constitutes not less than 3 weight percent nor more than 8 weight percent of said resin-coated particles.

31. A method as defined in claim 30 wherein said resin is bonded to said substrate with an organofunctional silane coupling agent.

32. A method of fracturing a subterranean formation penetrated by a well which comprises injecting into said well a fracturing fluid to form a fracture in said formation; injecting into said formation a carrier fluid having suspended therein a proppant composed of particles coated with partially polymerized, hard shell, one-step resole-type phenolic resin which is curable to an infusible state at a temperature below that of the formation temperature; and thereafter permitting said resin to first melt and then cure thereby bonding said particles together.

33. A method as defined in claim 32 wherein the proppant is placed in said fracture in multilayers.

34. A method for controlling the production of sand in a subterranean formation which comprises placing a filter bed of aggregate adjacent to said formation, said aggregate being sized to retard the production of formation sand and being a composite material comprising a substrate material coated with a hard, partially cured, one-step, resole-type phenolic resin, thereafter causing said resin to fuse and cure to an infusible state thereby bonding the aggregate together into a cohesive, permeable mass.

35. A method as defined in claim 34 wherein said resin is cured solely by formation heat.

36. A method of gravel packing a well penetrating a subterranean formation which comprises placing a screen liner in said well, placing an aggregate including a solid resole-type phenolic resin in said well in surrounding relation to said liner, and thereafter causing said resin to fuse and cure to an infusible state.

* * * * *

Dedication 3,929,191.—*John Wayne Graham; Thomas Wayne Muecke* and *Claude Everett Cooke, Jr.*, Houston, Tex. METHOD FOR TREATING SUBTERRANEAN FORMATIONS. Patent dated Dec. 30, 1975. Dedication filed Mar. 25, 1983, by the assignee, *Exxon Production Research Co.*

Hereby dedicates to the Public the entire remaining term of said patent.

[*Official Gazette July 5, 1983.*]